(12) United States Patent
Shapiro et al.

(10) Patent No.: US 6,521,810 B2
(45) Date of Patent: Feb. 18, 2003

(54) CONTAMINANT TREATMENT METHOD

(75) Inventors: Andrew Philip Shapiro, Schenectady, NY (US); Roy Fred Thornton, Schenectady, NY (US); Joseph James Salvo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 20 days.

(21) Appl. No.: 09/893,377

(22) Filed: Jun. 27, 2001

(65) Prior Publication Data

US 2002/0013506 A1 Jan. 31, 2002

Related U.S. Application Data

(63) Continuation-in-part of application No. 09/298,433, filed on Apr. 23, 1999, now abandoned.

(51) Int. Cl.$^7$ .............................. A62D 3/00; C02F 1/461
(52) U.S. Cl. ................. 588/204; 205/743; 204/515
(58) Field of Search .................. 205/743, 766, 205/770; 204/555, 515, 556, 519; 588/204

(56) References Cited

U.S. PATENT DOCUMENTS

| 5,074,986 A | 12/1991 | Probstein et al. ............ 204/130 |
| 5,120,414 A | 6/1992 | Carson et al. ............ 204/180.1 |
| 5,362,394 A | 11/1994 | Blowes et al. ............... 210/617 |
| 5,391,305 A | 2/1995 | Haitko ........................ 210/757 |
| 5,398,756 A | 3/1995 | Brodsky et al. ............. 166/248 |
| 5,476,992 A | 12/1995 | Ho et al. ..................... 588/204 |
| 5,477,639 A | 12/1995 | Smith ............................. 47/58 |
| 5,510,033 A | 4/1996 | Ensley et al. ................ 210/611 |
| 5,614,077 A | 3/1997 | Wittle et al. ................. 205/704 |
| 5,736,637 A | 4/1998 | Evans et al. .............. 73/152.31 |
| 5,750,036 A | 5/1998 | Sivavec ..................... 210/747 |
| 5,861,090 A | 1/1999 | Clarke et al. ............... 205/688 |

OTHER PUBLICATIONS

Burell, C.J. et al., "Electroosmotic Removal of Gasoline Hydrocarbons and TCE from Clay," J. Environ. Eng. Jan./Feb., 1992, vol. 118, No. 1, 68–83.

Segall, B.A. et al., "Electroosmotic Contaminant–Removal Processes," J. Environ. Eng. 1992, Jan./Feb., vol. 118, No. 1, 84–100.

Acar, Y.B. et al., "Phenol Removal from Kaolinite by Electrokinetics," J. Geoteck Eng. Nov., 1992, vol. 118, No. 11, pp. 1837–1852.

*Primary Examiner*—Nam Nguyen
*Assistant Examiner*—Thomas H. Parsons
(74) *Attorney, Agent, or Firm*—Bernadette M. Bennett; Noreen C. Johnson

(57) ABSTRACT

The present invention provides a method for treating contaminated media. The method comprises introducing remediating ions consisting essentially of ferrous ions, and being peroxide-free, in the contaminated media; applying a potential difference across the contaminated media to cause the remediating ions to migrate into contact with contaminants in the contaminated media; chemically degrading contaminants in the contaminated media by contact with the remediating ions; monitoring the contaminated media for degradation products of the contaminants; and controlling the step of applying the potential difference across the contaminated media in response to the step of monitoring.

19 Claims, 3 Drawing Sheets

CONTAMINANT TREATMENT METHOD

CROSS-REFERENCE TO RELATED APPLICATION

This application is a continuation-in-part of copending application Serial No. 09/298,433, filed Apr. 23, 1999.

STATEMENT REGARDING FEDERALLY SPONSORED RESEARCH & DEVELOPMENT

The U.S. Government may have certain rights in this invention pursuant to Contract No. DEAC05-96-OR-22459, awarded by the U.S. Department of Energy.

BACKGROUND OF THE INVENTION

The present invention relates to a method for treating contaminated soils and ground waters. In particular, the invention relates to treating soil that is contaminated with halogenated hydrocarbons, such as halogenated hydrocarbons in aqueous compositions.

Halogenated hydrocarbons, such as chlorinated hydrocarbons, are also known as chlorinated solvents (hereinafter collectively referred to as "chlorinated solvents"). Halogenated hydrocarbons have low flammability and are fairly stable, both chemically and biologically. They are commonly used in industry as chemical carriers and solvents, paint removers, and cleaners. The cleaning applications typically include metal degreasing, circuit board cleaning, metal parts cleaning, and dry cleaning. Chlorinated solvents are also used as intermediates in chemical manufacturing and as carrier solvents for pesticides and herbicides.

Chlorinated solvents are stable compounds, are relatively toxic at low levels, and many chlorinated solvents have been classified as suspected or confirmed carcinogens. Chlorinated solvents are among prevalent contaminants in ground water and soil because of their widespread use and stability. Ground waters and soils have become contaminated by chlorinated solvents from various sources. These sources include, but are not limited to, disposal facilities, chemical spills, and leaking underground storage tanks. Chlorinated solvents also may be released to the environment through the use, loss, or disposal of a neat liquid, and alternatively through the use or disposal of wash and rinse waters containing residual solvents.

Movement and dispersion of chlorinated solvents in the subsurface soils and ground waters vary depending on whether the solvents are released as a neat liquid or in a dissolved form. If released in a dissolved form, chlorinated solvent migration is governed largely by hydro-geological conditions and processes. The presence of solubilizing agents, such as soaps from wash waters, counteracts natural soil sorption-retardation mechanisms for chlorinated solvents, and enhances migration of the chlorinated solvents.

If chlorinated solvent is released as a neat liquid, the chlorinated solvent migrates through soil under the force of gravity. A portion of the chlorinated solvent is typically retained in soil pores. If sufficient chlorinated solvent is present in the soil, the soil pores become saturated. Additional chlorinated solvent continues to migrate in the soil until it encounters a physical barrier or a water table. If the chlorinated solvent encounters a water table, the chlorinated solvent disperses until it encounters, accumulates, and overcomes the water table's capillary forces. At this point, the chlorinated solvent, which has a greater density than water, penetrates the water table's surface. The chlorinated solvent migrates under the force of gravity until its amount has been diminished through sorption, or until the chlorinated solvent encounters an aquitard.

In recent years, soil and ground water contamination by chlorinated solvents has become an environmental problem. Chlorinated ethylenes, such as trichloroethylene (TCE), tetrachloroethylene (commonly known as perchloroethylene (PCE)), and chlorinated ethanes, such as 1,1,1-trichloroethane (TCA), which have been used as degreasing agents in a variety of industrial applications, pose environmental problems. Even though chlorinated degreasing agent use was curtailed in 1976, improper storage and uncontrolled disposal practices have resulted in contamination. Due to the high water solubility of chlorinated solvents, for example about 1100 mg/L TCE at 25° C., chlorinated solvents are highly mobile in soils and aquifers, and should be removed before dispersing too far. Therefore, a treatment to remove chlorinated solvents from contaminated soil and ground water is needed.

A pump-and-treat method is a proposed treatment method removing contaminants from contaminated ground water. The treatment usually involves withdrawing contaminated water from a well, volatilizing the contaminants in an air stripping tower, and adsorbing vapor-phase contaminants into granular-activated-carbon (GAC). There are limitations to this pump-and-treat method. The method is relatively inefficient, and some sites can require treatment for extended periods of time.

Chlorinated solvents can be degraded into less harmful materials by a method commonly referred to as "reductive dechlorination," in which chlorine is replaced by hydrogen. The reductive dechlorination uses metallic, solid reaction elements, such as iron and zinc, to degrade chlorinated solvents and other organic compounds. For example, Gillham, U.S. Pat. No. 5,266,213, discloses feeding contaminated ground water through a trench containing iron to degrade contaminants. The Gillham process is conducted under strict exclusion of oxygen and occurs over a long time period. The Gillham process often requires large amounts of iron for complete reaction. Furthermore, it is difficult to introduce large volumes of solid reaction material, such as iron, using the Gillham process at effective depths for in situ remediation.

Clarke et al., U.S. Pat. No. 5,861,090, discloses a method that electrochemically remediates soil, clay, or other organic-polluted, contaminated media. The Clarke process remediates contaminated media using Fenton's Reagent. In Clarke, anodes and cathodes are provided in wells, which are disposed in the contaminated media. Anolyte and catholyte solutions are circulated in the contaminated media to deliver ions, such as-iron ions, to anodes and to deliver ions, such as peroxide ions, to cathodes. A potential difference is applied across the contaminated media and causes the peroxide and iron ions to migrate toward each other through the contaminated media. The organic pollutants are destroyed by reactions with the ions. While Clarke teaches possible contaminated content monitoring and adjusting steps, Clarke does not disclose control of potential difference in response to contaminant content monitoring.

Therefore, a controllable process that effectively treats contaminated soils and ground waters compositions is needed, particularly for controlling a potential difference applied to the contaminated media. Further, the process should enable control of potential difference in response to contaminant content monitoring.

SUMMARY OF THE INVENTION

The present invention provides a method for treating contaminated media. The method comprises introducing remediating ions consisting essentially of ferrous ions, and being peroxide-free, in the contaminated media; applying a potential difference across the contaminated media to cause the remediating ions to migrate into contact with contaminants in the contaminated media; chemically degrading contaminants in the contaminated media by contact with the remediating ions; monitoring the contaminated media for degradation products of the contaminants; and controlling the step of applying the potential difference across the contaminated media in response to the step of monitoring.

In another embodiment of the present invention, a method for treating contaminated media comprises determining a chlorinated hydrocarbon content of the contaminated media by sampling and analysis; introducing remediating ions being peroxide free, at an electrode disposed proximate the contaminated media; applying a potential difference across the contaminated media between electrodes to cause the remediating ions to migrate into contact with chlorinated hydrocarbons in the contaminated soil region; chemically degrading contaminants in the contaminated media by contact with the remediating ions to produce chloride ions; determining a chloride ion content; and controlling the step of applying the potential difference, the step of controlling being in response to the chloride ion content.

In a further embodiment of the present invention, a method for treating a contaminated media includes the steps of introducing ferrous ions, said ions being peroxide-free, at an iron-containing anode disposed proximate the contaminated media; applying a potential difference across the contaminated media between at least one cathode and the iron-containing anode that are disposed proximate the contaminated media to cause the remediatitig ions to migrate into contact with contaminants in the contaminated media.

DETAILED DESCRIPTION OF THE INVENTION

The present invention comprises a method for controllably treating contaminated media, such as, but not limited to, at least one of contaminated soil and contaminated ground water. The following description will refer to "contaminated media," and includes contaminated soil, contaminated ground water, and combinations, mixtures and suspensions thereof. The description of the present invention refers to chlorinated solvents. The scope of the present invention includes contaminants comprising, but not limited to, chlorinated solvents, chlorinated hydrocarbons; halogenated hydrocarbons; chlorinated ethylenes, such as trichloroethylene (TCE), tetrachloroethylene, commonly known as perchloroethylene (PCE); chlorinated ethanes, such as 1,1,1-trichloroethane (TCA); combinations and mixtures thereof.

Figure 1:
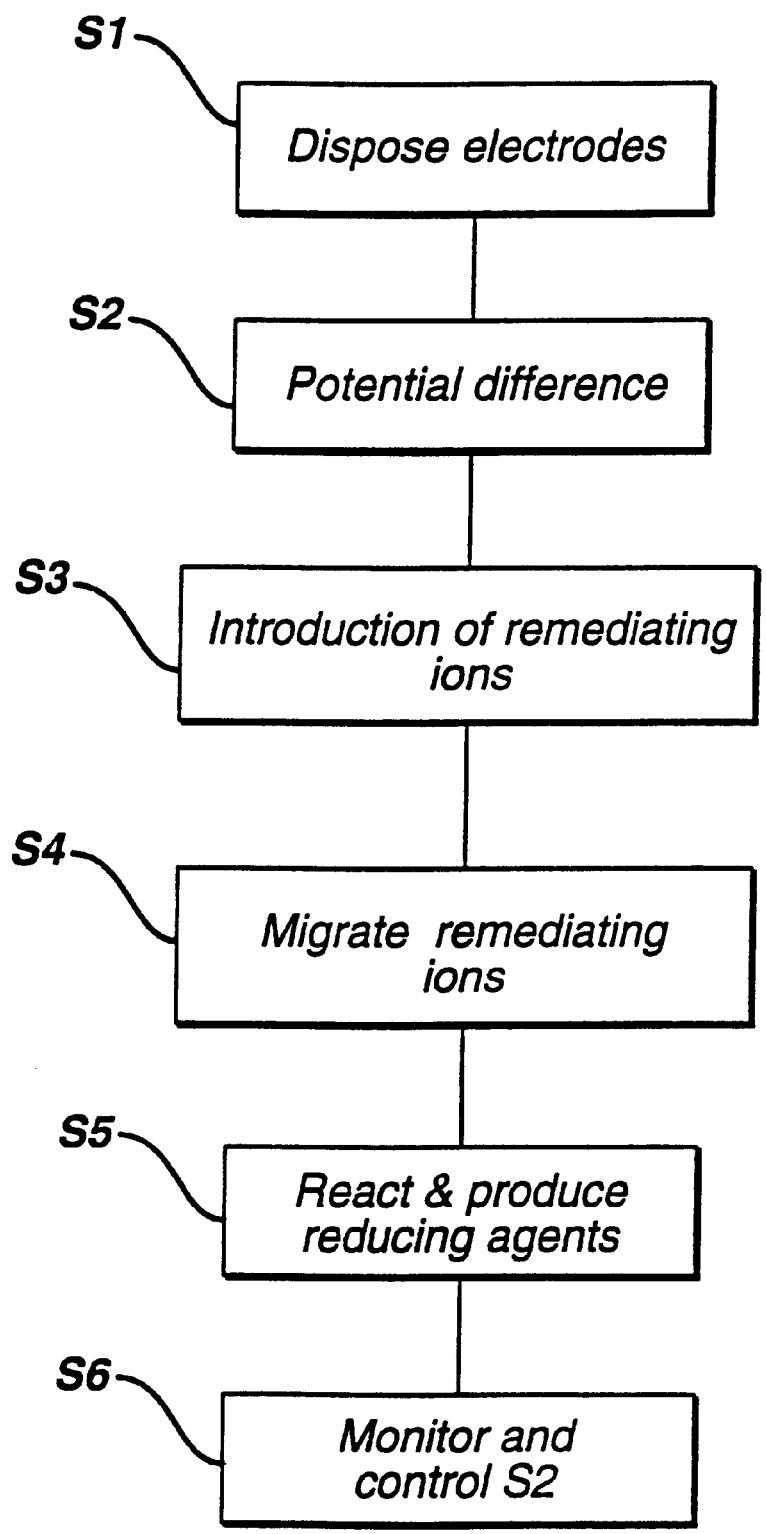
FIG. 1 is a flow chart of a method for controllably treating contaminated media.

The method for controllably treating contaminated media, as embodied by the present invention, will be described with reference to the flow chart of FIG. 1. The method comprises disposing (also known in the art as "emplacing") electrodes in the contaminated media in step S1. The electrodes comprise at least one anode and at least one cathode. Alternatively, the electrodes are disposed around the contaminated media. In the following description of the present invention, the electrodes are described as "proximate" the contaminated media, which means that the electrodes are disposed in the contaminated media, are disposed around the contaminated media, or are disposed in and around the contaminated media.

In an exemplary method, electrodes are disposed in the contaminated media by disposing a cathode at a first location, such as an end of the contaminated soil region. An anode is located at an opposite end of the of the contaminated soil region. Therefore, ion flow can be created between the cathode to the anode across the contaminated soil region.

At least one of the anodes and cathodes comprise an iron-containing material. For example, an anode is formed as an iron anode. As used herein, the term "cathode" and the term "anode" are used in the singular, however the terms can mean a single electrode or a plurality of electrodes. The electrodes are disposed at approximately the same plane or level, for example, the same horizontal, vertical, or diagonal level. The levels depend on whether the contaminated-media treatment zone is disposed vertically, horizontally, or diagonally with respect to a contaminated media surface. Electrical connections, electrode sizes, and electrode materials for the electrodes include varying specifications depending on each treatment. For example, the electrodes may comprise carbon, in addition to iron, since carbon is a corrosion resistant material, in which carbon aids in pH buffering of the treatment method.

The electrodes may also comprise at least one of porous and perforated structures, each of which permits ingress and egress of liquid, for example ground water. Alternatively, the electrodes are located within a perforated container, which is disposed in the contaminated media. A further alternative comprises electrodes that are disposed behind a liquid permeable barrier in the contaminated media.

A potential difference is applied across the contaminated media in step S2. The potential difference is activated by applying a direct current (DC) electrical field in the contaminated media. The DC electrical field is applied between the electrodes to create the potential difference across the contaminated media.

The application of the potential difference in step S2 causes the ions to migrate and contact contaminants in the contaminated media. This migration is an electrokinetic process called "electromigration." Electromigration means the movement of ionic contaminants in a matrix toward an electrode of opposite charge when a constant, low DC electrical current is applied to electrodes. Comparatively, electroosmosis is the movement of water in a soil matrix resulting from an electric field. Electroosmosis and electromigration are known processes to those of ordinary skill in the art.

Remediating ions are then introduced at the anode in step S3 with the proviso that the remediating ions are peroxide-free. For example, the remediating ions comprise ferrous ions (peroxide-free), if the anode comprises an iron-containing material. The introduction of iron ions at an iron-containing anode will dissolve the iron-containing anode. While the iron ions are adsorbed, to a limited degree, in the contaminated media, ion migration will occur once an equilibrium is attained between adsorbed and dissolved iron ions.

The introduction of the ions in step S3 comprises direct treatment, such as chemical degradation by reductive dechlorination, of contaminated material with ferrous ions, for example ferrous ions, in an aqueous solution. Alternatively, the introduction of the ions in step S3 comprises dissolution of ferrous ions that are provided by an interaction of iron-bearing minerals with organic and inorganic reducing agents. A further alternative for the introduction of the ions in step S3 comprises dissolution of ferrous ions that result from iron metal corrosion. Another alternative of introduction of the ions in step S3, within the scope of the invention, comprises dissolution of ferrous ions that are formed by electrolytic processes at iron electrodes. Furthermore, another alternative of the introduction of the ions in step S3 comprises dissolution of ferrous ions produced by stimulation and growth of iron-reducing bacteria in iron-containing substrates such as, but not limited to, soil sediment.

The DC electrical field, which is applied to the contaminated media, causes the formed remediating ions to migrate in and through the contaminated media, in step S4. The migration typically is from the anode, where the remediating ions are generated, to the cathode. The migration permits the remediating ions to reach contaminated-media regions, where conventional pump-and-treat methods and other known hydraulic pumping treatment processes cannot reach. For example, but in no way limiting of the present invention, the migration permits remediating ions to reach low-permeability contaminated media, where prior pumping treatments could not reach.

The remediating ions react with the contaminated media and produce reducing agents, in step S5. The reducing agents react with contaminants and effectively treat the contaminates in the contaminated media, for example by chemical degradation by reductive dechlorination, so any harmful effects are lessened. The reducing agents, including but not limited to, ionized reducing agents, provide in situ reductive dechlorination of the contaminated media. The process, as embodied by the present invention, can be applied to treat and remove the chlorinated solvent from contaminated media.

The method, as embodied by the present invention, is monitored and controlled in step S6. The monitoring and control of the method occur in response to a contaminant content in the contaminated media. The monitoring step can comprise an initial sampling of the contaminated soil region to determine a baseline contaminant level, including chlorine amounts, followed by periodic monitoring of the contaminate level during the process to determine the progress of the process. In step S6, the contaminant content of a contaminated-media region is monitored as to the contaminant level. The monitored-contaminant level is compared to the baseline contaminant level and is used to control the potential difference in the method. The control of the potential difference comprises at least one of increasing, redirecting, and terminating the application of the DC electrical field, and thus its potential difference. Therefore, progress of the treatment can be determined through the monitoring step S6.

One method of controlling the process comprises determining and monitoring contaminant content. The monitoring of contaminant content comprises initially determining the initial contaminant content by initial sampling and analysis, as above. Chloride ion content is then monitored during the treating of the contaminated soil region treatment, for example by chemical degradation by reductive dechlorination, and compared to the initial contaminant content. Thus, progress of the treatment can be determined. The electrode potential difference, applied in step S2, can be controlled for example by increasing, redirecting, or terminating according to the treatment progress and the monitored-contaminant content. A processor, such as, but not limited to a computer, can analyze contaminant content, and adjusts the electrode potential difference in response to the contaminant content level.

The scope of the present invention comprises any use of a remediating ion with the proviso that the remediating ion is peroxide-free, which is effective to reduce chlorinated solvents in the contaminated media, for example by reductive chlorination. Therefore, the remediating ions can comprise known remediating ions, such as those disclosed in Sivavec, U.S. Pat. No. 5,750,036.

Figure 2:
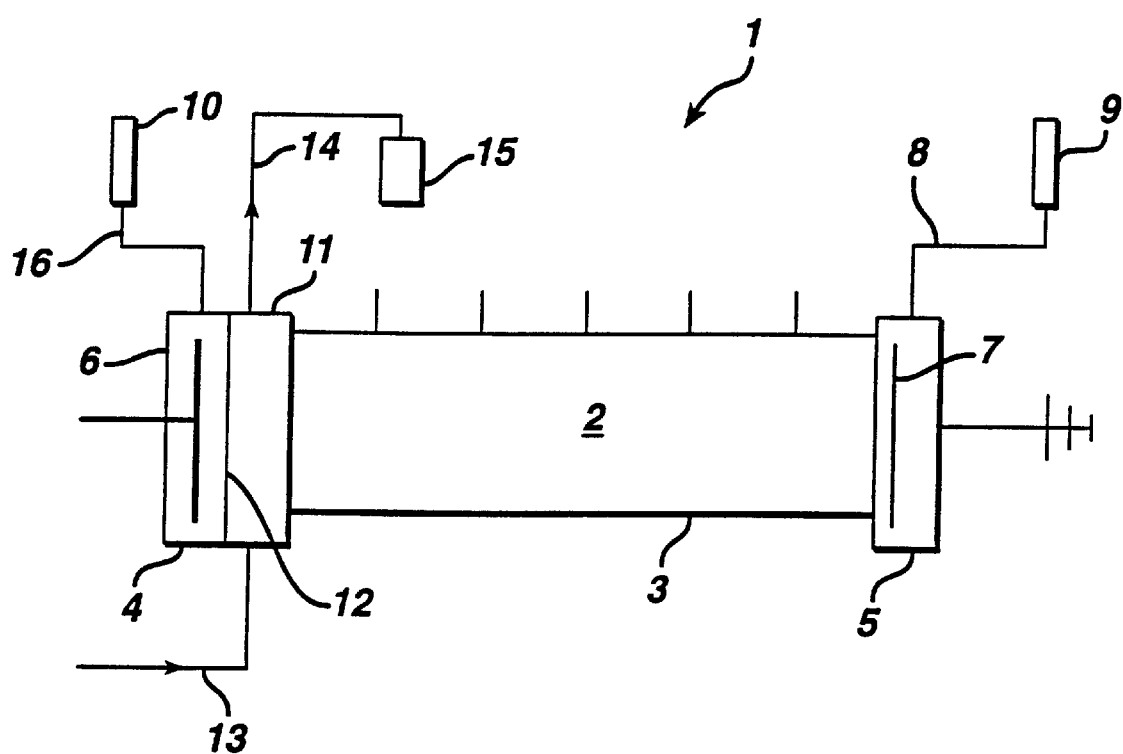
FIG. 2 is a schematic representation of a system for migrating a remediating salt into at least a portion of a zone.

These and other features will become apparent from the following example, which describes exemplary embodiments of the present invention. The example is in no way limiting of the present invention. This example demonstrates the feasibility of creating a treatment system for reactive soil and water that reductively dechlorinates TCE. The experiment was conducted in the apparatus 1, illustrated in FIG. 2. A contaminated media sample 2, in the example a clay-soil specimen, was loaded into a glass cylindrical cell 3. The diameter of the glass cylindrical cell 3 is about 5 centimeters (cm) and its length and the length of the contaminated media sample 2 is about 15 cm. These dimensions are merely exemplary of the apparatus 1. Other dimensions and apparatuses are within the scope of the present invention.

Receptacles 4 and 5 house electrodes 6 and 7, respectively. The receptacles 4 and 5 are disposed at ends of the glass cylindrical cell 3. Electrode 6 comprises an anode and electrode 7 comprises a cathode. The receptacle 5 is connected through a conduit 8 to a graduated receptacle (vessel) 9. The vessel 9 measures electroosmotic flow rate.

The anode 6 comprises an iron-containing material. The anode 6 can be submerged in anolyte at the start of the experiment. For example, an anolyte that comprises about 1 mM $Na_2SO_4$, can be supplied from the anolyte reservoir 10 through conduit 16.

The anode 6 is separated from a feed chamber 11 by a cation exchange membrane 12. The cation exchange membrane 12 allows cations, such as ferrous ions, to migrate and pass through toward the cathode 7. Anions, such as, but not limited to, chloride ions, however do not migrate therethrough and are rejected by cation exchange membrane 12. These anions accumulate in the feed chamber 11.

A solution, for example a feed solution that comprises about 100 ppm TCE, is feed through conduit 13 into a bottom portion of the feed chamber 11. The flow rate of the TCE through the conduit 13 is typically higher than its electroosmotic flow through the contaminated media sample 2. Any feed solution that does not pass through the contaminated media sample 2 by electroosmosis, overflows the chamber 11. The overflow feed solution is passed through line 14 and is then collected in receptacle 15. Feed solution that is collected in the receptacle 15 is then analyzed for chlorides by an appropriate device (not illustrated). The results are used for controlling the process, and the application of the potential difference between the electrodes.

One exemplary analyzing process comprises comparing the rate of chloride removal to the rate of TCE input into the contaminated media sample 2 as the apparatus 1 reaches a steady state. The comparison indicates a soil effectiveness for dechlorinating TCE. Additionally, effluent at the cathode 7 is analyzed and measured for unreacted TCE to purge solution analysis.

Figure 3:
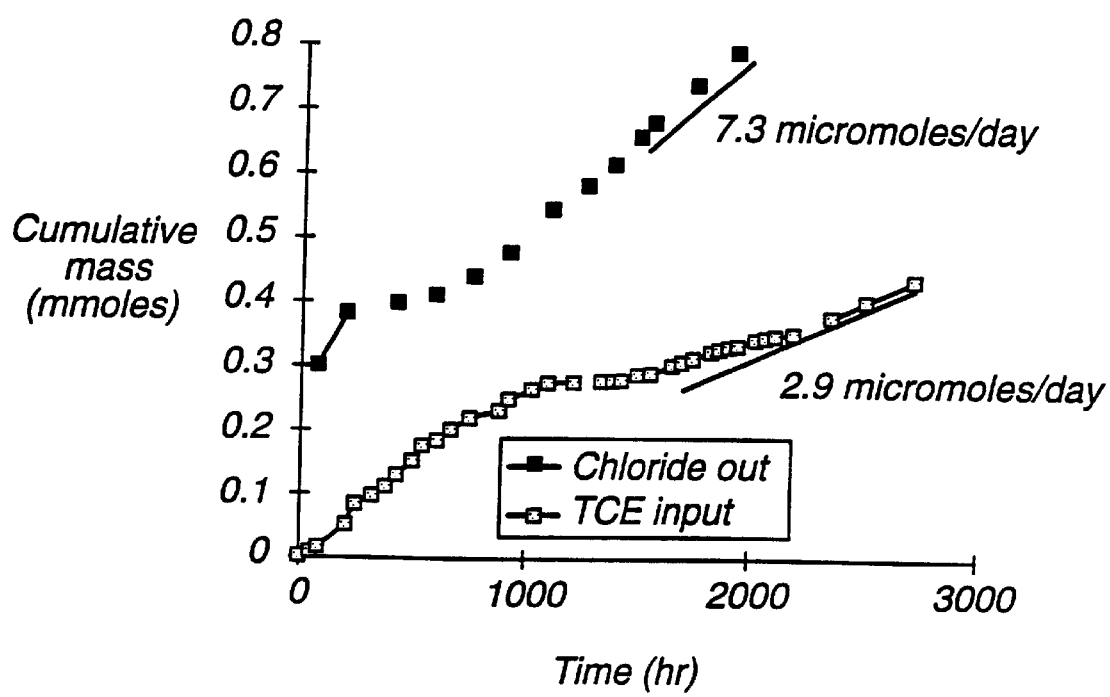
FIG. 3 is a graph of accumulated mass of trichloroethylene (TCE) input and collected chloride (chloride out) versus time according to a method of the invention.

Results of the example are graphed in FIG. 3. In FIG. 3, the cumulative mass of TCE input through the conduit 13 into the glass cylindrical cell 3 ("TCE input") and the cumulative mass of chloride that is collected in the feed chamber overflow receptacle 15 ("Chloride out") are graphed versus time. In the example, a ratio of chloride moles removed from the glass cylindrical cell 3 (7.3 μmoles/day) to TCE input to the glass cylindrical cell 3 (2.9 μmoles/day) is 0.84. If the exemplary treatment process were 100 percent effective, three moles of chloride would be produced for every mole of TCE fed into the system 1. The example illustrates that about 84% of TCE fed into the glass cylindrical cell 3 by electroosmosis is dechlorinated.

While embodiments of the present invention have been described, the present invention is capable of variation and modification, and therefore should not be limited to the description herein. The present invention includes changes and alterations that fall within the purview of the following claims.

What is claimed:

1. A method for in situ decontamination by reductive dehalogenation of contaminated media including ground water, soil, and mixtures of soil and ground water contaminated by halogenated hydrocarbons, the method comprising:
    introducing remediating ions consisting essentially of ferrous ions, and being peroxide-free, into the contaminated media;
    applying a potential difference across the contaminated media to cause the remediating iron ions to migrate into contact with halogenated hydrocarbon contaminants in the contaminated media;
    chemically degrading the contaminants by reductive dehalogenation in the contaminated media by contact with the remediating iron ions;
    monitoring the contaminated media for halide degradation products of the halogenated hydrocarbon contaminants; and
    controlling the potential difference across the contaminated media in response to the step of monitoring halide degradation products.

2. The method of claim 1, wherein the step of monitoring comprises monitoring a contaminant content of the contaminated media and the step of controlling the potential difference is in response to the step of monitoring of the contaminant content.

3. The method of claim 1, wherein the step of monitoring comprises monitoring a configuration of contaminants of the contaminated media and the step of controlling the potential difference is in response to the monitoring of the configuration of contaminants.

4. The method of claim 1, wherein the step of monitoring further comprises:
    monitoring sampling the contaminated media for a contaminant content; and
    determining a degradation product of contaminant content of the contaminated media.

5. The method of claim 1, wherein the step of monitoring further comprises determining a distribution of the contaminant content within the contaminated media and the step of controlling the potential difference is in response to the distribution of the contaminant content.

6. The method of claim 1, wherein the step of monitoring further comprises determining an amount of the contaminant content within the contaminated media and the step of controlling the potential difference is in response to the amount of the contaminant content.

7. The method of claim 1, wherein the step of introducing remediating ions comprises disposing electrodes disposed proximate the contaminated media.

8. The method according to claim 7, wherein the step of disposing electrodes comprises disposing at least one an anode and at least one cathode.

9. The method according to claim 7, where the step of applying a potential difference comprises applying the potential difference between at least one anode and at least one cathode.

10. A method according to claim 1, wherein the step of introducing the remediating ions comprises disposing iron-containing electrodes disposed proximate the contaminated media and at least one of:
    direct treatment by reductive dechlorination of contaminants with ferrous ions in an aqueous solution; dissolution of ferrous ions that are provided by an interaction of iron-bearing minerals with organic and inorganic reducing agents; dissolution of ferrous ions that result from iron metal corrosion of the iron-containing electrodes; dissolution of ferrous ions that are formed by electrolytic processes at iron-containing electrodes; or dissolution of ferrous ions produced by stimulation and growth of iron-reducing bacteria in the contaminated media.

11. The method of claim 1, wherein the step of generating remediating ions at the anode comprises generating ferrous ions.

12. The method of claim 1, wherein the anode comprises iron and the step of generating remediating ions at the iron anode comprises generating ferrous ions.

13. The method of claim 1, wherein the contaminated media comprises at least one of:
    soil; ground water; an aquifer, or combinations thereof.

14. The method of claim 1, wherein the contaminated media is contaminated with a halogenated hydrocarbon.

15. The method of claim 1, wherein the contaminated media is contaminated with a chlorinated hydrocarbon.

16. A method for treating contaminated media, the method comprising:
    determining a chlorinated hydrocarbon content of the contaminated media by sampling and analysis;
    introducing remediating ions, said remediating ions being peroxide-free, at an electrode disposed proximate the contaminated media;
    applying a potential difference across the contaminated media between electrodes to cause the remediating ions to migrate into contact with chlorinated hydrocarbons in the contaminated soil region;
    chemically degrading contaminants in the contaminated media by contact with the remediating ions to produce chloride ions;
    determining a chloride ion content; and controlling the step of applying the potential difference, the step of controlling being in response to the chloride ion content.

17. The method of claim 16, wherein the electrodes comprise at least one anode and at least one cathode, and the remediating ions comprise ferrous ions generated from at least one of the electrodes.

18. The method of claim 16, wherein the step of controlling comprises using a processor to control the step of applying the potential difference.

19. A method for treating a contaminated media, the method comprising:

introducing ferrous ions, said ferrous ions being peroxide-free, at an iron-containing anode disposed proximate the contaminated media;

applying a potential difference across the contaminated media between electrodes that comprise at least one cathode and the iron-containing anode that are disposed proximate the contaminated media to cause the remediating ions to migrate into contact with contaminants in the contaminated media.

* * * * *